Figure 1:
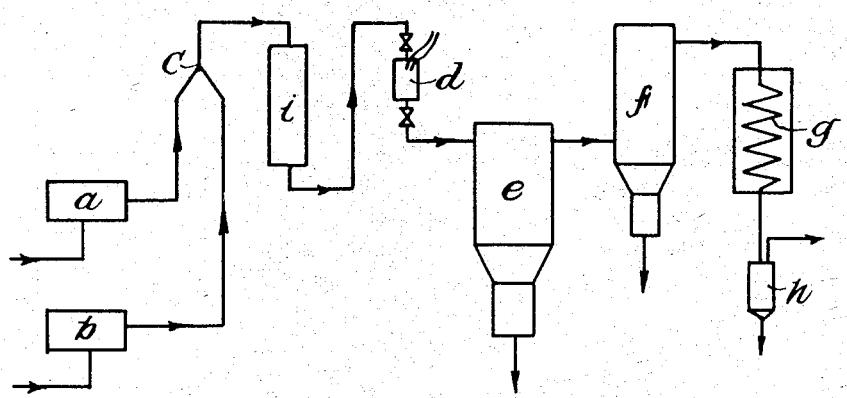
Figure 2:
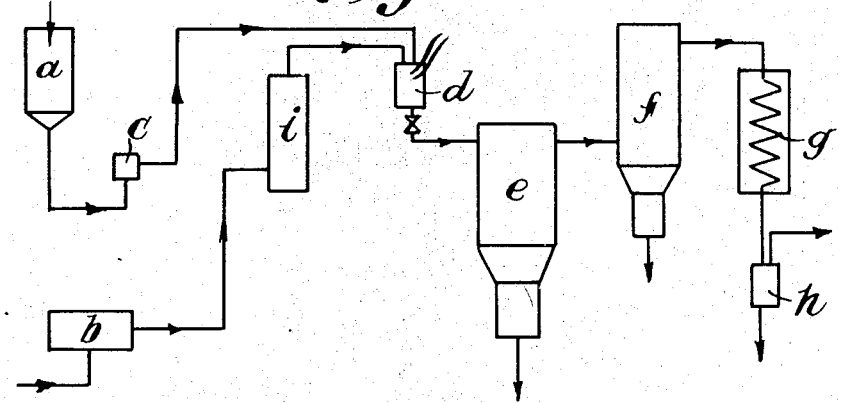

Patented Jan. 14, 1941

2,228,543

UNITED STATES PATENT OFFICE 2,228,543

PROCESS OF PRODUCING HIGH QUALITY CARBON BLACK

Hermann Vollbrecht and Richard Hupe, Frankfort-on-the-Main, Germany, assignors, by mesne assignments, to Chemical Marketing Company Inc., New York, N. Y.

Application May 3, 1937, Serial No. 140,442
In Germany May 8, 1936

7 Claims. (Cl. 23—209.7)

The present invention relates to the art of manufacturing carbon black and, more particularly, to an improved process of producing high quality carbon black from hydrocarbons.

Heretofore, various processes have been used for the production of carbon black. It was already known that acetylene, ethylene or their mixtures with each other, with methane or with other hydrocarbons may be utilized for producing carbon black on a commercial scale. Recently, a very successful and efficient process has been introduced for the production of carbon black involving the explosion of hydrocarbon gas mixtures containing predetermined amounts of oxygen, the explosive decomposition being carried out at normal or at elevated pressures. It has been found that a high quality carbon black can be produced by exploding mixtures of such hydrocarbons with a quantity of oxygen considerably greater than the minimum required for the formation of an explodible mixture at elevated pressures. In order to increase the output of the apparatus, the explosions were produced in rapid succession so that the carbon black produced was removed from the reaction chamber by the rapid expansion of the residual gases. Generally, a surge or storage tank was interposed between the mixing device and the reaction chamber. By means of this surge tank, the pressure was maintained practically constant and, what is of great importance, also the constitution of the mixture was maintained substantially constant. From the surge or storage tank, the mixture was passed to the reaction or explosion chamber by suitable inlet and conduit means. In the reaction chamber, the explodible mixture was ignited by conventional ignition means such as a spark plug, incandescent wire, or in some cases merely by the high compression of the mixture. A process of this character is disclosed in the co-pending application of Lajos von Szeszich, Serial No. 33,824, filed July 30, 1935, which issued as U. S. Patent No. 2,150,790 on March 14, 1939.

In accordance with this recent patent, a gas obtained by decomposition of a coke oven gas is treated in connection with oxygen and at an initial pressure of about 6 atmospheres. The ignition of the gas mixture is carried out by means of a glow wire and the operation is regulated in such manner that about 100 explosions per minute are produced. The composition of the gas to be treated is as follows:

| Constituent | Amount |
|---|---|
| | Percent |
| $CO_2$ | 0 |
| $C_nH_{2n}$ | *25.2 |
| $O_2$ | 0.0 |
| $CO$ | 1.2 |
| $H_2$ | 0.0 |
| $C_nH_{2n+2}$ | **70.0 |
| $N_2$ | 3.6 |

*Carbon number 2.2.
**Carbon number 1.3.

The lower ignition limit at about 6 atmospheres initial pressure is at an oxygen concentration of about 28%. Only carbon black with practically useless qualities may be obtained in this manner. The experimental results for different $O_2$ concentration of the mixture are the following:

| $O_2$ in the initial gas percent | Carbon black yield in proportion with the C content of the initial gas percent | Coloring ability factor | Rubber testing | |
|---|---|---|---|---|
| | | | Breaking strength, kg./cm. | Breaking elongation, percent |
| 30.8 | 37.8 | 1.50 | 193 | 463 |
| 36.8 | 20.3 | 1.70 | 214 | 579 |
| 41.8 | 19.7 | 1.85 | 229 | 605 |

When determining the coloring strength coefficient (factor), the depth of color of the carbon is compared with the commercial Sechsbrand carbon as a standard and baryte (heavy spar) mixture and taking the coloring depth of the Sechsbrand carbon as the unit. The test with rubber is carried out in the conventional manner. The numbers given correspond to average figures obtained from a number of tests with different duration of the vulcanization. The corresponding values for the well known American rubber carbon are:

Breaking strength _____ kg./cm.$^2$ __ 213
Breaking elongation _____ per cent __ 578

In the waste gases which according to the reaction conditions contain about 24–35% CO, about 51 to 57% $H_2$, about 15 to 2% $CH_4$, and about 80 to 85% of the heating value of the gases used is retained.

The introduction of the gases is preferably effected by means of two compressors, of which the one (a) (Fig. 1) propels and/or compresses the gases containing carbon while the other (b) propels and/or compresses the oxygen or the gas mixture containing oxygen. The mixing of the two reaction constituents is preferably carried out in a mixing arrangement or chamber (c) before entering the reaction vessel. The adjustment of the desired mixture proportion of the two gases is obtained by adjusting the output of the two compressors or by means of conventional automatic mixing controls. It is advisable to provide a pressure resistant tank (i) between the mixer and the reaction vessel (d), this tank should have a capacity which is multiple of that of the reaction vessel. This tank makes it possible to uniformly fill up the reaction chamber to the desired working pressure, and, on the other hand, it prevents the sudden occurrence of gas mixtures which are either too rich in oxygen or too poor in oxygen so that they are not capable of exploding. Such variations would otherwise occur due to the irregularities in the operation of the compressors. In the reaction vessel (d) the mixture of carbon-containing substances and oxygen-bearing gases is exploded to form carbon black and a combustible gas. The reaction products leaving the reaction vessel in the manner of a stroke and comprising gas and carbon black are conducted to a suitably dimensioned carbon separator (e). The separation of carbon is preferably carried out in such manner that the reaction products are tangentially introduced into a drum-like container. By means of this separator, the greater part of the carbon produced is separated from the waste gases which contain but little carbon and are led into a filter (f) for complete purification or into an electrical dust collecting system. Preferably, both the carbon separator and the cleaning system are maintained at a temperature which is above the dew point of the combustion or waste gases, so that the water produced by the reaction does not precipitate together with the carbon. This makes subsequent drying of the carbon unnecessary and prevents clogging of the filter. The waste gas after being completely freed from carbon is introduced into a cooler (g) in order to deposit the water formed during the reaction which is separated in separator (h) from the waste gas.

Although this process has been very satisfactory and permitted to produce carbon black of excellent quality on a practical and industrial scale, various difficulties have been experienced in the practical operation. Thus, it has been found that already a short time after the operation of the apparatus has been started, self-ignition of the explosive mixture was caused, even though the apparatus was carefully cooled. In other words, the explodible gas mixture was automatically ignited and exploded as soon as it was introduced into the reaction chamber and without the actuation of the ignition means therein. In most cases the ignition means have been only used when the reactiton or the operation of the apparatus was started and have been completely disconnected hereafter. This form of operation was satisfactory to a certain extent, however, frequently the explosion of the gas mixture through the self-ignition occurred so soon after the introduction of the gases or even during the introduction thereof that the explosion would backfire into the surge tank or even further back into the conduits causing dangerous and destructive explosions or at least serious interruptions in the smooth operation of the plant. Of course, the danger of these explosions considerably increased the operating costs and thus has reduced the efficiency of the carbon producing plant.

We have discovered that the dangers and disadvantages inherent to the self-ignition of explodible hydrocarbon mixtures may be eliminated in a simple and efficient manner.

It is an object of the present invention to provide an improved process for producing high-quality carbon black from explodible mixtures of hydrocarbons and of oxygen-containing gases which completely eliminates the disadvantages and dangers connected with the automatic or self-ignition of the explodible mixtures.

It is another object of the present invention to provide a novel and improved process of producing high-quality carbon black from explodible mixtures of hydrocarbons and oxygen-containing gases by a rapid succession of explosions without dangerous and undesirable permature explosions or backfiring.

It is a further object of the present invention to provide a process of producing high-quality carbon black by introducing an explodible mixture of hydrocarbon gases and of oxygen-containing gases into a reaction chamber involving critical control of the rate, period and velocity of the introduction of the gas mixture.

The invention also contemplates an improved process for the production of high qualtity carbon black from explodible gas mixtures by means of rapidly following explosions which may be readily carried into practice on a practical and industrial scale and without requiring any complicated or costly changes in existing installations.

Other and further objects and advantages of the invention will become apparent from the following description.

Broadly stated, according to the principles of our invention the disadvantages and dangers of automatic or self ignition or backfiring can be avoided in a simple and positive manner by providing critical control of the time during which the initial materials are introduced into the reaction chamber. We have discovered that the back firing is successfully avoided by providing inlet periods of the reaction gases which are shorter than 0.5 second and are preferably of the order of 0.01 second. Surprisingly, under these conditions the danger of backfiring is completely avoided even in the case when a surge tank or the like is connected before the reaction or explosion chamber. It has been also ascertained that further advantages are obtained by providing a constant velocity of the explodible gases when they are introduced into the reaction chamber during the limited inlet periods according to the principles of the invention. These critical operating conditions can be accomplished in an advantageous manner by maintaining the pressure in the surge tank at a pressure considerably higher, but at least 1½ times as high than the desired inlet pressure prevailing in the reaction chamber.

The desirable constant rate and velocity of admission during the inlet period is accomplished according to the invention by providing such control and actuation of the inlet means or valves that reduction in the inlet pressure during the inlet period is compensated for by increasing the cross section through which the gases are introduced into the reaction chamber. In this manner substantially constant inlet velocities of the gas mixture are maintained. At the end of the inlet period it is preferred to provide a sudden, stroke-like closure of the inlet means. Although the cause of self ignition is not completely determined, it appears that the catalytic effect of the carbon formed and remaining in part in the reaction chamber may be at least in part responsible therefore. Of course, the principles and the advantages of our invention are clear irrespective of the circumstance whether this explanation is correct or only approximative.

In order that those skilled in the art may have a better understanding of the invention, the following detailed description is given.

Hydrocarbon gases are compressed by a compressor or some other conventional means. Oxygen-containing gases are likewise compressed by a second compressor or other corresponding means. The compressed gases are introduced into a mixing device in such a proportion that considerably more oxygen is present in the mixture than the minimum necessary for producing an explodible mixture but at the same time the oxygen is insufficient for oxidizing all of the carbon present. The explodible mixture thus provided is now introduced into a surge or storage tank. The pressure of the mixture in the surge tank is maintained at a value which is considerably higher, preferably at least 1.5 times higher than the preferred initial pressure in the reaction chamber. Valve or nozzle means are provided for admitting the explodible mixture into the reaction chamber. The inlet means are so constructed and arranged that the inlet cross section is substantially in inverse proportion with the pressure differential between the inlet main and the reaction chamber. Thus, when the difference in pressure between the inlet main and the reaction chamber becomes less, the cross section through which the gases are admitted into the reaction chamber is increased. This will maintain substantially constant inlet velocities and will insure inlet periods which are less than about 0.5 second and are preferably of the order of 0.01 second. Preferably, the valve is automatically actuated by the drop in pressure on the inlet main. It is of importance to insure that the valve is closed tightly at the end of each inlet period in a stroke-like manner and that it remains in such closed position during the full reaction period.

Although the present invention has been described in connection with a preferred embodiment thereof, variations and modifications may be resorted to by those skilled in the art without departing from the principles of the present invention. We consider all of these variations and modifications as within the true spirit and scope of the present invention as disclosed in the present description and defined by the appended claims.

We claim:

1. The process of producing high quality carbon black which comprises compressing gases containing hydrocarbons, compressing gases containing oxygen, mixing said compressed gases to form a compressed mixture containing hydrocarbon gases and oxygen-containing gases wherein the oxygen content is about 40% and considerably greater than that necessary to form an explodible mixture but less than that necessary to completely oxidize all the carbon present, establishing a body of said explodible gas mixture having a volume several times that of a reaction chamber and having a substantially constant constitution and pressure, maintaining a pressure on said body of gas mixture greater than the initial filling pressure of a reaction chamber, passing a portion of said body of gas mixture in the form of a stream of gas to said reaction chamber, varying the cross section of said gas stream in accordance with the change in the difference in pressure between said gas stream and said reaction chamber to fill said reaction chamber at a constant rate sufficiently rapid to preclude back firing and in not more than about 0.5 second, closing said reaction chamber, igniting said gas mixture in said closed chamber to form carbon black and residual gases containing hydrogen and carbon monoxide and removing said carbon black by a practically adiabatic expansion of said residual gases whereby premature explosions of said explodible gas mixture are avoided.

2. The process of producing high quality carbon black which comprises compressing gases containing hydrocarbons, compressing oxygen-containing gases, mixing said compressed gases to form a compressed mixture containing hydrocarbon gases and oxygen-containing gases wherein the oxygen content is considerably greater than that necessary to form an explodible mixture but less than that necessary to completely oxidize all the carbon present, pumping said compressed gas mixture to a surge tank to establish a substantial body of gas mixture therein and to maintain the constitution and pressure of said body substantially constant, maintaining a pressure on said body of gas mixture about 1.5 times as great as the initial filling pressure of a reaction chamber, passing a portion of said gas mixture from said surge tank as a stream of gas to said reaction chamber, varying the cross section of said gas stream in accordance with the change in the difference in pressure between said gas stream and said reaction chamber, filling said reaction chamber with said gas stream during a period of about 0.01 second, closing said reaction chamber, exploding the contents of said reaction chamber to form carbon black and residual gases containing hydrogen and carbon monoxide and removing said carbon black by a practically adiabatic expansion of said residual gases whereby premature explosions of said explodible gas mixture are avoided.

3. The process of producing high quality carbon black from hydrocarbon gases which comprises forming a mixture containing hydrocarbon gases and oxygen-containing gases at elevated pressures wherein the oxygen content is considerably greater than that necessary to form an explodible mixture but less than that necessary to completely oxidize all the carbon present, establishing a body of said explodible mixture having a volume several times that of a reaction chamber to maintain the constitution and the pressure thereof substantially constant, maintaining said body at a pressure considerably greater than the initial filling pressure of a reaction chamber, conveying portions of said body of gas mixture as streams of gas to said reaction chamber, varying the cross section of said gas streams inversely in proportion to the change in the difference of pressure between said gas streams and the pressure of said reaction chamber to fill said reaction chamber with said gas streams during periods of not more than about 0.5 second and at a rate sufficiently rapid to substantially eliminate propagation of the subsequent explosion to that portion of the explodable mixture yet to be introduced into the reaction chamber, closing said reaction chamber after each filling, exploding the contents of said reaction chamber after each filling to form carbon black and residual gases containing hydrogen and carbon monoxide, opening said reaction chamber after each explosion and expelling said carbon black whereby said reaction chamber is filled at a practically constant rate and premature explosions of said explodable gas mixtures are avoided.

4. The process of producing high quality carbon black which comprises forming an explodible mixture containing hydrocarbon gases and oxygen-containing gases under elevated pressure wherein the oxygen content of about 40% of said explodible mixture is considerably greater than that necessary to form an explodible mixture but less than that necessary for complete oxidation of all the carbon present, establishing a body of said explodible mixture having a volume greater than that of a reaction chamber to maintain the constitution and the pressure thereof substantially constant, maintaining said body at a pressure greater than the initial filling pressure of a reaction chamber, passing a portion of said body of gas mixture to said reaction chamber as a stream of gas while restricting the cross section of said gas stream inversely in proportion to the pressure differential between said body of explodible gas mixture and said reaction chamber to fill said reaction chamber at a substantially constant rate during a period of not more than 0.5 second, said period being short enough to limit propagation of the subsequent explosion to that portion of said explodible gas mixture yet to be introduced into said reaction chamber, closing said reaction chamber, igniting the contents of said reaction chamber to obtain an explosion and to form carbon black and residual gases, and opening said chamber and expelling said carbon black whereby premature explosions of said explodible mixture are avoided.

5. The process of producing high quality carbon black which comprises establishing a body of an explodible mixture as a stream of gas containing hydrocarbon gases and oxygen-containing gases wherein the oxygen content of about 40% is considerably greater than that necessary to form an explodible mixture but less than that necessary for complete oxidation of all the carbon present, said body of explodible mixture having a volume several times greater than that of the reaction chamber and having a substantially constant constitution and pressure, maintaining said body at a pressure greater than the initial filling pressure of a reaction chamber, introducing a portion of said body of explodible mixture as a stream of gas at elevated pressures into said reaction chamber while restricting the cross-section of said gas stream inversely in proportion to the pressure differential between said body of explodible mixture and said reaction chamber to fill said reaction chamber at a substantially constant rate during a period of about 0.01 second until said reaction chamber is filled, closing said reaction chamber, igniting the contents of said reaction chamber to produce an explosion and form carbon black and residual gases, opening said reaction chamber, expelling said carbon black by a practically adiabatic expansion of said residual gases and repeating the aforesaid steps in rapid succession whereby premature explosions of said explodible mixture are avoided.

6. The process of producing high quality carbon black which comprises establishing a body of explodible mixture containing hydrocarbon gases and oxygen wherein said oxygen content is about 40% and greater than that necessary to form an explodible mixture but less than that necessary for complete oxidation of all the carbon present, said body of explodible mixture having a substantially constant constitution and pressure, and having a volume several times that of a reaction chamber, maintaining said body at a pressure greater than the initial filling pressure of a reaction chamber, intermittently introducing portions of said body of explodible mixture at elevated pressures into said reaction chamber as streams of varying cross section, the cross sections of said streams being varied inversely in proportion to the pressure differential between said body of explodible mixture and said reaction chamber at a substantially constant rate during periods of about 0.01 second, exploding the contents of said reaction chamber after introducing each of said portions to form carbon black and residual gases containing hydrogen and carbon monoxide, and expelling said carbon black, whereby said reaction chamber is filled at a substantially constant rate and premature explosions are avoided.

7. The process of producing high quality carbon black which comprises establishing a body of an explodible mixture having a volume greater than that of a reaction chamber and containing hydrocarbon gases and oxygen wherein said oxygen content of about 40% is considerably greater than that necessary to form an explodible mixture but less than that necessary for complete oxidation of all the carbon present, said body of explodible mixture having a substantially constant temperature and pressure, maintaining said body at a pressure greater than the initial filling pressure of a reaction chamber, introducing a portion of said body of explodible mixture as a stream of gas at elevated pressures into said reaction chamber while restricting the cross section of said gas stream inversely in proportion to the pressure differential between said body of explodible mixture and said reaction chamber to fill said reaction chamber at a substantially constant rate during a period of not more than about 0.5 second and exploding the contents of said reaction chamber whilst said chamber is closed to form carbon black whereby premature explosions are avoided.

HERMANN VOLLBRECHT.
RICHARD HUPE.